United States Patent [19]
Matty

[11] 3,749,994
[45] July 31, 1973

[54] SPEED CONTROL SYSTEM

[75] Inventor: Thomas C. Matty, Irwin, Pa.

[73] Assignee: Westinghouse Electric Corporation, Pittsburgh, Pa.

[22] Filed: Nov. 16, 1971

[21] Appl. No.: 199,218

[52] U.S. Cl. .................................................. 318/563
[51] Int. Cl. ............................................. G05b 9/02
[58] Field of Search............. 318/318, 138, 563–565

[56] References Cited
UNITED STATES PATENTS

| | | |
|---|---|---|
| 3,669,207 | 6/1972 | Fellgett et al.................. 318/563 X |
| 3,110,853 | 11/1963 | Jones............................... 318/318 |
| 3,578,871 | 5/1971 | Sakamoto....................... 318/563 X |
| 3,483,455 | 12/1969 | Klysa, Jr. et al................. 318/563 |

Primary Examiner—Bernard A. Gilheany
Assistant Examiner—W. E. Duncanson, Jr.
Attorney—F. H. Henson, Jack M. Arnold et al.

[57] ABSTRACT

Speed control system, particularly adapted for use with automatic rapid transit systems, which employs hybrid analog-digital techniques and two independent redundant signal processing channels to achieve a high degree of fail safety as well as a high degree of speed control accuracy.

5 Claims, 1 Drawing Figure

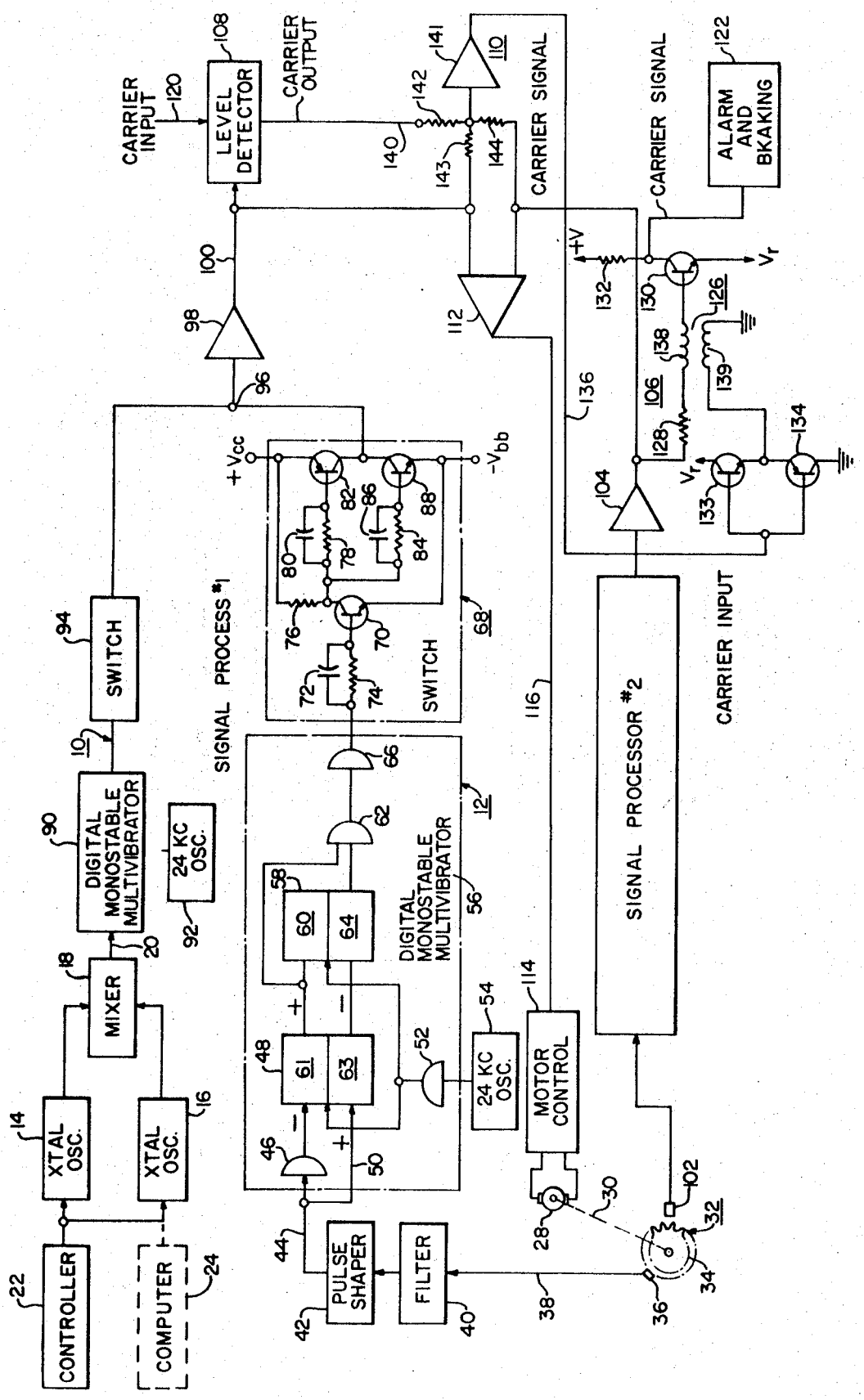

3,749,994

SPEED CONTROL SYSTEM

BACKGROUND OF THE INVENTION

In the past, the typical speed measuring device found on transit vehicles was the pulse tachometer. The pulse tachometer provides speed information in the form of a pulse rate which is converted to an analog signal used in an analog signal processor. The difficulty with systems utilizing tachometers for speed monitoring, however, is that they do not provide for a high degree of safety, nor are they particularly accurate. This, of course, is an important consideration in any automated transit system as contrasted with manually operated transit systems.

SUMMARY OF THE INVENTION

In accordance with the present invention, a speed control system is provided which employs redundancy techniques together with hybrid analog-digital techniques to achieve a high degree of fail safety and speed control accuracy. In the system of the invention, two tachometers which produce signals proportional to vehicle speed and two substantially identical signal processing channels are provided for redundancy. Each such signal processing channel is adapted to produce an output error signal which is equal in magnitude but opposite in polarity from the output signal of the other signal processing channel when all systems are operating properly. The output signal from each channel is applied to respective level detectors which provide control signals to an alarm and braking device which brakes the vehicle or train of vehicles whenever an overspeed condition is sensed. At the same time, the signal outputs of the two channels are compared. When these two signal outputs are not the same magnitude, indicating a failure in one or possibly both channels, an alarm is again actuated and the vehicle braked. The signal outputs of the two signal processing channels are summed and the mean value of the resultant summation is used as an error signal for controlling the drive motors for the vehicle during the times an overspeed condition is not sensed.

In each of the two identical signal processing channels of the speed control system, a reference signal having a frequency proportional to desired vehicle speed is generated by means of using two crystal oscillators which have their respective signal outputs heterodyned, with the resultant difference frequency being selected as the reference signal. This latter reference signal, and a signal derived from one of the aforesaid two tachometers, which has a frequency proportional to actual speed, are then applied to separate digital monostable multivibrators which produce calibrated pulses at their respective outputs which have precisely known widths for each pulse applied to the input. The signal outputs of the respective digital monostable multivibrators are then applied to separate precision voltage switches which switch, with a high degree of accuracy between two predetermined voltage levels. Therefore, the signal outputs of the respective voltage switches comprise pulses which correspond in average voltage level to a very accurate precentage of the average voltage level of the two predetermined voltage levels.

In order to eliminate the need for resistors of precise value and other analog components, the proposed speed control and monitoring system compares the respective output voltage pulses from the precision switches in terms of proportional amounts, not absolute values. This latter comparison is performed in a single operational amplifier which then provides at the amplifier output the required error signal for speed control and speed monitoring.

As will be understood, a system of the type described is insensitive to changes in voltage levels and component tolerances since control is based upon comparison (i.e., ratios) of signals in redundant circuit channels.

The above and other objects and features of the invention will become apparent from the following detailed description taken in connection with the accompanying single figure drawing which schematically illustrates one embodiment of the invention.

DETAILED DESCRIPTION OF THE PREFERRED EMBODIMENT

With reference now to the FIGURE, there are illustrated two signal processors No. 1 and No. 2. Since both signal processors are substantially identical, only signal processor No. 1 will be described in detail hereinafter.

Signal processor No. 1 includes two signal channels 10 and 12. Signal channel 10 includes two crystal oscillators 14 and 16, the respective signal outputs of which are connected to individual signal inputs of a mixer 18 which produces at its signal output a difference frequency signal on lead 20. Actually, the oscillators 14 and 16 in the drawing each represent a plurality of oscillators, each such oscillator providing different output frequencies. A manual controller 22 connects selected ones of the latter oscillators to the inputs of mixer 18 to produce a desired difference output frequency signal representing desired vehicle speed. In the alternative, in the case of a computer-controlled transit system, a computer 24 may be used to connect selected ones of the oscillators to the mixer 18 to produce a desired difference signal output frequency.

The vehicle to be controlled is driven by means of a drive motor 28 which is connected through a mechanical linkage 30 to a gear reducer 32 which, in turn, is connected to the wheels of the controlled vehicle, not shown. The gear reducer 32 includes a gear 34; and in close proximity with the teeth of the gear 34 is a magnetic pickup 36 which procudes an output signal, on lead 38, having a frequency proportional to the speed of the controlled vehicle. The signal on lead 38 is processed by a filter 40 and then is applied to a pulse shaper 42, such as a Schmitt trigger circuit, which produces on lead 44 an output square-wave signal having a frequency proportional to the speed of the controlled vehicle.

These latter square-wave pulses manifested on lead 44 are then applied to the input of a NAND circuit 46 and to one side 63 of a first digital flip-flop 48 by way of a line 50. The output of NAND circuit 46 is connected to the input of the other side 61 of the flip-flop 48. Connected to the clock input of flip-flop 48 by way of NAND circuit 52 is a 24-kilocycle oscillator 54, the arrangement being such that the flip-flop 48 cannot switch from one stable-state to the other until a clock pulse is received from the oscillator 54. The flip-flop 48 is one of two flip-flops which comprise a digital monostable multivibrator 56. A second flip-flop 58 has its inputs connected to the outputs of the flip-flop 48. Connected to the clock input of flip-flop 58 is the output of the NAND circuit 52 such that the flip-flop 58 switchs from one stable-state to the other in response to the provision of a clock pulse from the 24-kilocycle oscillator 54.

The input to one side 60 of the flip-flop 58 from the output side 61 of flip-flop 48 is also connected to a first input of NAND circuit 62, and the output of the second side 64 of the flip-flop 58 is connected to the second input of the NAND circuit 62. Let us assume, for example, that the pulses provided at the output of the pulse shaper or Schmitt trigger circuit 42 are positive. Under these latter circumstances, a negative pulse is applied to the input of the upper half 61 of the flip-flop 48 by way of NAND circuit 46; while a positive pulse is applied to the input of the bottom half 63 of the flip-flop 48. In response to the application of a clock pulse, from the 24-kilocycle oscillator 54, to the clock input of flip-flop 48 in the presence of a pulse on lead 44, a positive signal is applied to the input of the upper half 60 of the flip-flop 58 while a negative signal is applied to the input of the lower half 64. The pulse applied to the lower half 64 is inverted by the flip-flop 58 such that it appears as a positive pulse applied to the second input of the NAND circuit 62. A positive pulse or signal is applied to the first input of the NAND circuit 62 by way of the input to the upper half 60 of the flip-flop 58. Hence, an output signal is provided at the output of NAND circuit 62 which in turn is applied to the input of NAND circuit 66 when positive and negative pulses are applied to the inputs of the halves 69 and 64 of flip-flop 58, respectively, in conjunction with the provision of a clock pulse from oscillator 54. Since the digital monostable multivibrator 56 cannot produce an output pulse in the absence of a clock pulse from the 24-kilocycle oscillator 54, and since the frequency of the pulses from the pulse shaper 42 is much less than 24 kilocycles, it will be appreciated that the signal output from the multivibrator 56 is a square wave having a pulse width precisely defined between its leading and trailing edges, of a time duration equal to the time duration between the clock pulses from oscillator 54. The frequency of the latter square wave is substantially the same as frequency of the pulses provided by the pulse shaper 42.

The pulse provided at the output of the digital monostable multivibrator 56 is applied to the input of a precision switch 68. The switch 68 includes a transistor 70 having its base connected by way of the parallel combination of capacitor 72 and resistor 74 to the output of the NAND circuit 66 in monostable multivibrator 56. The collector of transistor 70 in switch 68 is connected by way of resistor 76 to a source of potential, $V_{cc}$. Similarly, the emitter of transistor 70 is connected directly to a source of potential, $V_{bb}$. The collector of transistor 70 is connected by way of the parallel combination of resistor 78 and capacitor 80 to the base of transistor 82; and, in a similar manner, the same collector of transistor 70 is connected by way of the parallel combination of resistor 84 and capacitor 86 to the base of transistor 88. Transistors 82 and 88 are connected in series between the voltage sources $V_{cc}$ and $V_{bb}$ and, hence, at the junction between the collectors of the transistors 82 and 88 a voltage pulse of a precise amplitude essentially either $V_{cc}$ or $V_{bb}$, dependent on whether transistor 82 or 88, respectively, is conductive; and precise width is produced in response to each input pulse applied from the multivibrator 56.

Reverting again to channel 10 of signal processor No. 1, the output of the mixer 18 is connected to the input of a digital monostable multivibrator 90, which is substantially identical to the multivibrator 56 previously described; and connected at its clock pulse input to a 24-kilocycle oscillator 92, which is substantially identical to the oscillator 54 previously described. The oscillator 92 provides clock pulses for multivibrator 90. The output of the digital monostable multivibrator 90, in turn, is connected to the input of a switch 94 which performs the same function for channel 10 as does the switch 68, previously described, for channel 12. The signal outputs of the two switches 94 and 68 are summed at summing point 96, and the resultant sum signal is applied, as a difference signal, to the input of an operational amplifier 98. The amplifier 98 functions such that when the output signal of the first channel 10 is not equal to the output signal from the second channel 12, an error signal is provided on lead 100 at the output of amplifier 98 which is proportional in magnitude to the difference in frequency between the signal on lead 20 at the output of mixer 18 in signal channel 10 and the signal on lead 44 at the output of pulse shaper 42 in signal channel 12.

It is to be appreciated that the signal channel 10 determines desired speed, represented as a square-wave signal in which the square wave has a fixed amplitude and width, and a frequency dependent upon the selected or desired speed of the vehicle. The square wave signal at the output of signal channel 12 also has a fixed amplitude and pulse width, but a frequency dependent upon the actual speed of the vehicle. If the respective frequencies of the signals developed at the outputs of signal channels 10 and 12 are not the same, an error signal is developed at the input to amplifier 98; and in turn an error signal is provided on lead 100, for purposes to be described shortly.

Signal processor No. 2 is substantially identical to signal processor No. 1, and has its input connected to a proximity pickup 102 similar to pickup 36. The output signal from signal processor No. 2, comprising an error signal proportional in magnitude to the difference between desired and actual speeds, is applied to the input of an operational amplifier 104. The output of operational amplifier 104 is a signal which, under normal operating conditions, has the same magnitude but opposite polarity than the signal output from amplifier 98. The output from amplifier 104 is applied to a level detector 106; and, in a similar manner, the output of operational amplifier 98 is applied through lead 100 to a level detector 108. Additionally, the outputs of the two operational amplifiers 98 and 104 are applied to respective inputs of a balance detector 110. Finally, the output signals of the operational amplifiers 98 and 104, proportional in magnitude to the speed error signals from signal processor Nos. 1 and 2, respectively are applied to the respective inputs of an operational amplifier 112 which produces an output signal proportional to the mean value of the error signals provided at the outputs of amplifiers 98 and 104.

The signal output of the operational amplifier 112, in turn, is applied to the input of a motor control circuit 114 which controls the motor 28 for driving the controlled vehicle. It can readily be seen that should there be a difference between the actual and desired speed signals as determined by the signal processor Nos. 1 and 2 in the redundant circuits, a mean error signal is developed on lead 116 for varying the speed of the motor 28, as controlled by motor control device 114 and, hence, the speed of the controlled vehicle being driven.

Applied to respective inputs of the level detector 108, the balance network 110 and the level detector 106 is a carrier signal input.

The carrier signal input is initially applied to the signal input of the level detector 108, and in the event the latter detector is receiving a correct error signal input from amplifier 98, and the detector 108 is functioning properly, a carrier output signal is applied to the input of the balance detector network 110 via a line 140. The level detector 108 functions in like manner as the level detector 106, the operation of which is to be described shortly.

The carrier signal is applied to the signal input of amplifier 141 by way of a resistor 142. The opposite polarity error signals from processors 1 and 2, are applied to the signal input of amplifier 141 by way of resistors 143 and 144, respectively. In the event these latter error signals differ in magnitude by a predetermined amount the amplifier 141 is biased off, and the carrier signal is not applied to the carrier signal input of level detector 106 by way of a line 136. The biasing off of the amplifier 141, is indicative of one or possibly both of the signal processors 1 and 2, or the amplifiers 98 and 104 not functioning properly. It is also to be appreciated, that if the carrier signal input to amplifier 141 by way of level detector 108 is below a selected level, no carrier signal output is provided by amplifier 141.

The carrier signal output of balance detector 110 is applied to the carrier signal input of level detector 106, as was previously mentioned. In response to this latter carrier signal being at a selected level concurrent with a proper error signal being provided to the detector 106 b/ way of amplifier 104, a carrier signal output is provided to the signal input of an alarm and braking network 122. The network 122 is of the type that is only responsive to an alternating current (AC) or carrier signal input. Such networks are well known in the art and, for example, may have transformer coupling at the input or any combination of elements, that is responsive only to varying amplitude input signals at a predetermined frequency. Such networks may also take the form of filter circuits. In the event a carrier signal is not applied to the input of network 122, an alarm is actuated and the controlled vehicle is braked. It is seen therefore, that should the level detector 108 or the level detector 106 indicate that the level of the error signal is below a predetermined magnitude, or should the balance network 110 indicate that the signals from the operational amplifiers 98 and 104 are not of the same magnitude, then the carrier input on lead 120 does not pass to the alarm and braking circuit 122 and this as was explained, initiates an alarm, and brakes the vehicle, indicating that part of the circuitry is not operating properly.

The level detectors 106 and 108 for signal processor Nos. 1 and 2, respectively, are substantially identical, as was previously mentioned; and, accordingly, only the operation of level detector 106 is described in detail. The detector 106 includes a transformer 126 having one end of its secondary winding 138 connected by way of resistor 128 to the output of operational amplifier 104. The other end of the secondary winding 138 of transformer 126 is connected to the base of a transistor 130. The collector of transistor 130 is connected through resistor 132 to a source of positive potential (+V); while the emitter is connected to a source of reference potential $V_r$. The primary winding 139 of transformer 126, at one end, is connected to circuit ground while the other end is connected to the common emitter junction of two transistors 133 and 134. The collector of transistor 134 is connected to ground; while the collector of transistor 133 is connected to a source of reference potential $V_r$. The carrier signal input as was explained, is applied via lead 136 to the bases of both transistors 133 and 134 in detector 106.

The operation of the level detector circuit 106 can be explained by assuming that the signal input to the secondary winding 138 of transformer 126 is tied to the reference potential $V_r$. If the signal impressed at the secondary winding 138 of transformer 126 in response to the carrier signal applied to the primary 139, is greater than the base-to-emitter drop of transistor 130 relative to the reference $V_r$, the transistor 130 alternately becomes conductive and nonconductive, respectively at a frequency dependent on the carrier frequency, and an alternating output signal appears at the collector of transistor 130. If the input from circuit 104 is now moved to a voltage greater than the peak-to-peak secondary voltage away from the reference voltage $V_r$, then the transistor is either permanently switched ON or OFF. Also, if the input lead breaks, the output carrier signal is lost. Only if the transistor 130 is biased properly and if the carrier signal applied via line 136 has sufficient amplitude is an alternating output signal generated. As was explained, the collector output of the transistor 130 is connected to the alarm and braking circuit 122 in order that should the error exceed a given amount and an overspeed condition exists, alarm and braking will be initiated via circuit 122, in response to the absence of a carrier signal input.

Although the invention has been shown in connection with a certain specific embodiment, it will be readily apparent to those skilled in the art that various changes in form and arrangement of parts may be made to suit requirements without departing from the spirit and scope of the invention.

I claim:

1. In a vehicle control system, the combination comprising:
    first and second signal processors which provide respective signal outputs indicative of the difference in actual and desired speed of a vehicle;
    a first signal level detecting means responsive to the signal output of said first signal processor being within selected limits for passing a provided control signal;
    a second signal level detecting means responsive to the signal output of said second signal processor being within selected limits for passing a provided control signal;
    a third means responsive to the signal outputs of said first and second signal processors being essentially of the same magnitude for passing a provided control signal; and
    means responsive to one of (a) said first signal level detecting means not passing the provided control signal, or (b) said second signal level detecting means not passing the provided control signal, or (c) said third means not passing the provided control signal for providing an alarm signal manifestation.

2. The combination claimed in claim 1 wherein said means for providing an alarm signal manifestation includes means for braking said vehicle.

3. The combination claimed in claim 2 including means for comparing the signal outputs of said first and second signal processors for providing a speed control signal proportional to the mean value of the signal outputs of said first and second signal processors.

4. In a vehicle control system, the combination comprising:

first and second signal processors which provide respective error signal outputs indicative of the difference in the actual and desired speed of a vehicle, with the respective error signal outputs of said first and second signal processors being of the opposite sense;

a first signal level detecting means responsive to the signal output of said first signal processor being within selected limits for passing a provided carrier signal;

means responsive to the signal outputs of said first and second signal processors being essentially of the same magnitude and of opposite sense for passing the carrier signal passed by said first signal level detecting means;

a second signal level detecting means responsive to the signal output of said second signal processor being within selected limits for passing the carrier signal passed by said means responsive to the signal outputs of said first and second signal processors; and means responsive to said second signal level detecting means not passing the carrier signal for braking said vehicle.

5. In a vehicle speed control system, the combination comprising:

first and second signal processing means for providing respective signal outputs indicative of the difference in the actual and desired speed of a vehicle, with the respective signal outputs being of the opposite sense;

means for providing a vehicle speed command signal proportional to the mean value of the respective signal outputs of said first and second signal processing means;

means for providing a carrier signal;

a first signal level detecting means responsive to the signal output of said first signal processing means being within selected limits for passing a provided carrier signal;

a second signal level detecting means responsive to the signal output of said second signal processing means being within selected limits for passing a provided carrier signal;

a third means responsive to the signal outputs of said first and second signal processing means being essentially of the same magnitude for passing a provided carrier signal; and means responsive to any one of (a) said first signal level detecting means not passing the provided carrier signal, or (b) said second signal level detecting means not passing the provided carrier signal, or (c) said third means not passing the provided carrier signal for applying the brakes to said vehicle.

* * * * *